United States Patent
Weber et al.

(10) Patent No.: US 6,600,284 B1
(45) Date of Patent: Jul. 29, 2003

(54) SYSTEM FOR DETECTING OBSTACLES

(75) Inventors: Jens Weber, Kelkheim-Fischbach (DE); Jürgen Hoetzel, Florstadt (DE); Ega Tschiskale, Hoppetenzell (DE); Oliver Lamparth, Rielasingen (DE); Achim Speigel, Marxzell (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,783

(22) PCT Filed: Jun. 18, 1999

(86) PCT No.: PCT/DE99/01799

§ 371 (c)(1),
(2), (4) Date: May 22, 2001

(87) PCT Pub. No.: WO00/09355

PCT Pub. Date: Feb. 24, 2000

(30) Foreign Application Priority Data

Aug. 10, 1998 (DE) .......................... 198 36 056

(51) Int. Cl.⁷ .............................................. G01R 27/26
(52) U.S. Cl. ........................ 318/466; 318/479; 49/26; 49/28
(58) Field of Search ................... 318/266, 282, 318/283, 286, 466, 467, 469, 478, 479; 49/26, 27, 28; 296/107.01, 117; 340/552, 561; 361/181; 307/10.1; 324/686

(56) References Cited

U.S. PATENT DOCUMENTS

| | | | | |
|---|---|---|---|---|
| 5,621,290 A | * | 4/1997 | Heller et al. | 318/466 |
| 5,654,615 A | * | 8/1997 | Brodsky | 318/282 |
| 5,661,385 A | * | 8/1997 | McEwan | 318/478 |
| 5,801,501 A | * | 9/1998 | Redelberger | 318/283 |
| 6,150,781 A | * | 11/2000 | Hollerbach | 318/283 |

FOREIGN PATENT DOCUMENTS

| | | |
|---|---|---|
| DE | 40 04 353 | 8/1991 |
| EP | 0 648 628 | 4/1995 |
| EP | 0 856 425 | 8/1998 |

\* cited by examiner

Primary Examiner—Khanh Dang
(74) Attorney, Agent, or Firm—Kenyon & Kenyon

(57) ABSTRACT

In an arrangement for detecting obstacles, particularly during the automatic closing of convertible tops, motor-vehicle windows or the like, a capacitive sensor device is provided, made up of an electrically conductive transmitter area on the one side and an electrically conductive sensor wire and at least one essentially potential-free metal area on the other side of an insulator, the transmitter area and the sensor wire being linked to an evaluation circuit.

8 Claims, 2 Drawing Sheets

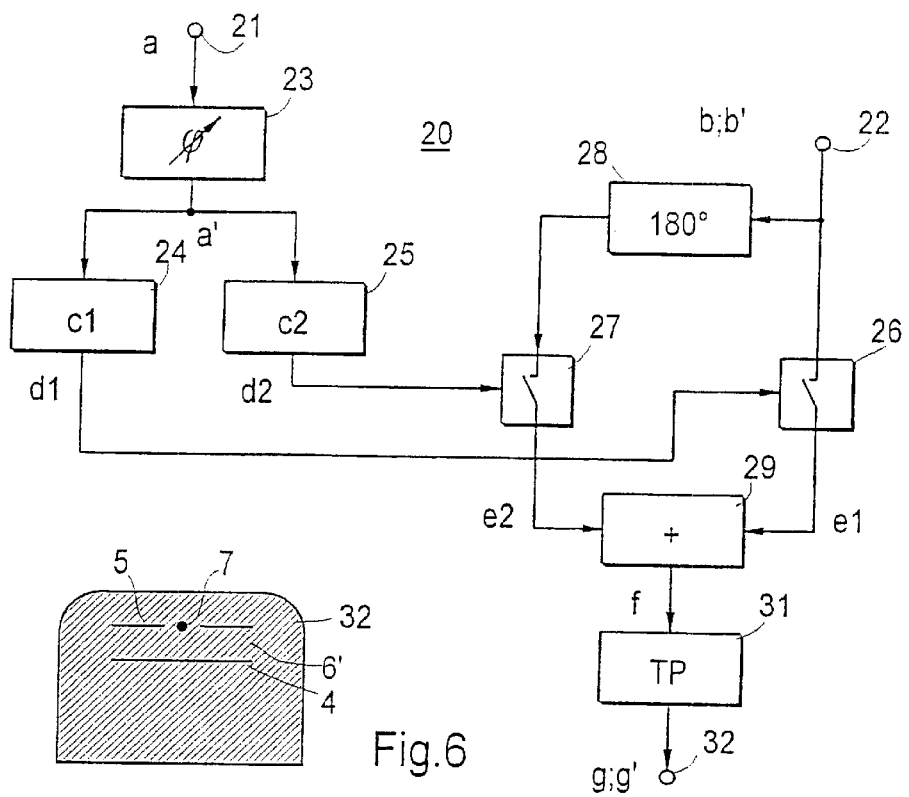
Fig.4
Fig.6
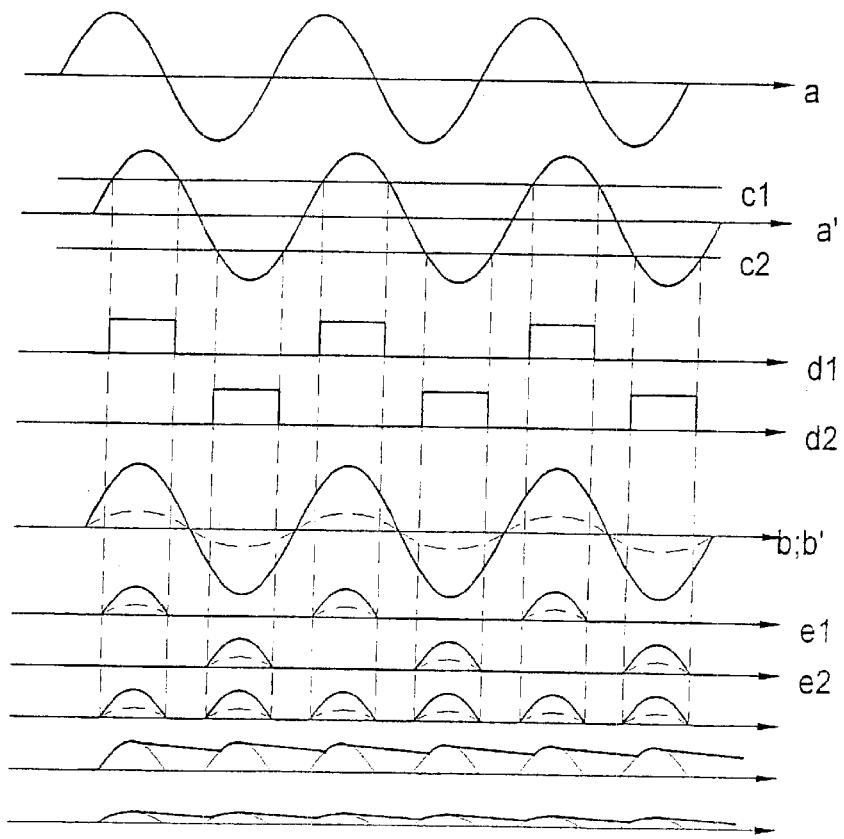
Fig.5

SYSTEM FOR DETECTING OBSTACLES

FIELD OF THE INVENTION

The invention relates to an arrangement for detecting obstacles, particularly during the automatic closing of convertible tops, motor-vehicle windows or other closing device.

BACKGROUND INFORMATION

During the automatic closing of convertible tops or side windows of a motor vehicle, the danger exists that, for example, the hand of a person or another object can become pinched between the closing convertible top and the crossbeam of the windshield, or between the closing side window and the upper crossbeam of the window frame. Naturally, this can result not only in damaging the pinched object, but possibly also the appertaining parts of the closing device.

SUMMARY OF THE INVENTION

Therefore, the object of the present invention is to specify an arrangement for detecting obstacles of the type indicated at the outset, which in a simple manner, ensures differentiation between obstacles and the closing convertible top or side windows.

This objective is achieved according to the present invention in that a capacitive sensor device is provided, made up of an electrically conductive transmitter area on the one side and an electrically conductive sensor wire and at least one essentially potential-free metal area on the other side of an insulator, and that the transmitter area and the sensor wire are connected to an evaluation circuit.

The arrangement of the present invention offers the advantage that a simple geometric design can be implemented for the motor vehicle. It prevents objects from becoming pinched and, in response to danger, switches off the motor or does not permit a motor startup.

One advantageous refinement of the arrangement according to the present invention provides that the transmitter area, which is acted upon by an AC voltage, is arranged opposite the metal area which is set apart by the insulator and which has a suitably formed cutout for accommodating the sensor wire in the insulator, and that the sensor wire is connected to the evaluation circuit, at whose output a motor switching signal can be picked off for switching a drive motor.

In this context, it has proven to be particularly worthwhile that the evaluation circuit is composed of a current-to-voltage converter for emitting a measuring signal and a downstream phase-dependent rectifier arrangement supplied with the AC voltage and the measuring signal, and that at the output of the phase-dependent rectifier arrangement, the motor switching signal can be picked off with a first level for enabling the drive motor, and with a second level for switching off the drive motor in response to the appearance of obstacles in the vicinity of the sensor device.

To prevent interference, it has proven to be particularly advantageous that the phase-dependent rectifier arrangement includes a phase shifter, at whose input the AC voltage is applied as reference signal, and whose output is connected to an input of two respective threshold circuits for the shunting of switching voltages, whose respective outputs are connected to a control input of two respective analog switches, and that the measuring signal is fed directly to the one analog switch and is fed inverted to the other analog switch, and that the output of each analog switch is connected to an input of an adding stage at whose output the motor switching signal can be picked off via a low-pass filter.

One particularly advantageous refinement of the present invention proposes that the sensor device for detecting obstacles during the closing of the convertible top be integrated in the crossbeam above the windshield of the motor vehicle.

In another advantageous variant of the invention, the sensor device for detecting obstacles during the closing of the side windows is integrated in the upper crossbeam of the window frames.

The insulator can be formed by a strip of suitable material. One particularly advantageous possibility for the design of the arrangement according to the present invention is to surround the sensor device with an elastic strip seal that also forms the insulator.

BRIEF DESCRIPTION OF THE DRAWINGS

FIG. 4 shows a block diagram of a phase-dependent rectifier arrangement according to an embodiment of the present invention.

FIG. 5 shows current- or voltage-time diagrams of signals appearing in FIG. 4.

FIG. 6 shows a cross-section through a sensor device arranged in a strip seal according to an embodiment of the present invention.

DETAILED DESCRIPTION

Figure 1:
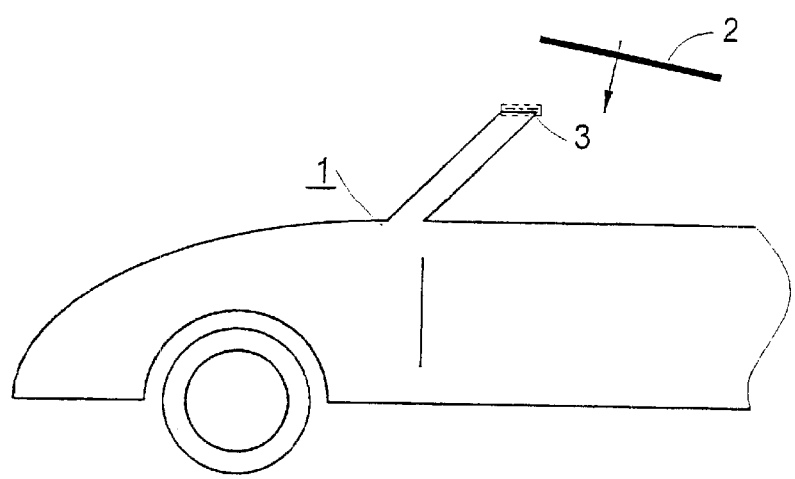
FIG. 1 shows the front part of a convertible in a side view.

FIG. 1 shows the outline of the front part of a convertible 1, in which while closing (in the arrow direction), convertible top 2 is approaching a capacitive sensor device 3 arranged above the windshield. Upon detection of obstacles such as human body parts in the vicinity of sensor device 3, with the aid of the evaluation circuit connected thereto, which is described in greater detail below, a drive motor— not shown in the drawing—provided for moving top 2 is controlled in such a way that it is impossible for an object to become pinched.

Figure 2:
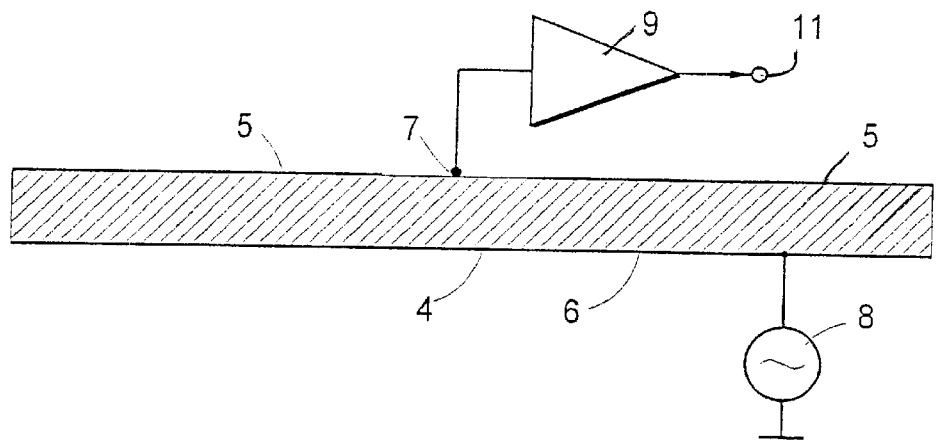
FIG. 2 shows a schematic representation of a capacitive sensor device according to an embodiment of the present invention.

Sensor device 3 proposed for detecting obstacles is shown schematically in FIG. 2. It essentially includes a transmitter area 4 made up electrically conductive material, a metal area 5 without fixed potential, an insulator 6 arranged between these two, and a sensor wire 7. Connected to transmitter area 4 is a sinusoidal oscillator 8 through which transmitter area 4 can emit an AC voltage—hereinafter also called sinusoidal signal—to the surroundings. This sinusoidal signal is received by sensor wire 7, acting as an antenna, and transmitted to an evaluation circuit 9 at whose output 11 a switching signal for the drive motor of the convertible top can be picked off.

Without an obstacle, the sinusoidal signal emitted by transmitter area 4 is applied with a specific field strength to sensor wire 7. In this context, the drive motor of the convertible top receives from output 11 a specific switching signal which, in the case that there is no danger, i.e. no obstacle in the pinching area, allows the automatic closing of top 2. If at this point an object or a person touches metal areas 5, because of the increased coupling of metal areas 5 to ground, the field intensity at sensor wire 7 weakens sharply. Consequently, the received sinusoidal signal markedly decreases, which means a corresponding switching signal switching off the drive motor appears at output 11 of evaluation circuit 9. In this manner, any contact of metal areas 5 is reliably detected, and the respective object is protected from being pinched. At the same time, switching-off by the approaching edge of the top is prevented prior to the contact.

Figure 3:
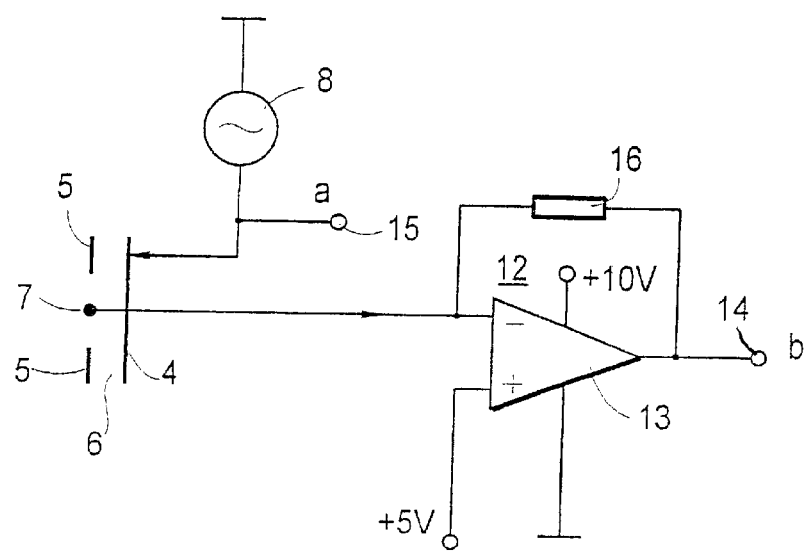
FIG. 3 shows a circuit diagram of the capacitive sensor device with connected input amplifier according to an embodiment of the present invention.

FIG. 3 shows a circuit diagram of an input amplifier 12 of evaluation circuit 9, the input amplifier being connected to sensor device 4 through 7 and functioning as a current-to-voltage converter, sensor wire 7 being directly connected to the inverting input of an operational amplifier 13 that is subject to negative feedback via a resistor 16 and at whose output 14 measuring signal b can be picked off. In this context, sinusoidal oscillator 8 is not only connected to transmitter area 4, but also to an output 15 at which sinusoidal signal a can be picked off.

Both sinusoidal signal a, which can be picked off at output 15, and measuring signal b, which can be picked off at output 14, are fed to a subsequent phase-dependent rectifier arrangement 20 according to FIG. 4 for further processing. Sinusoidal signal a is applied to input 21 and measuring signal b is applied to input 22.

To better clarify the block diagram according to FIG. 4, signals a through g occurring therein are shown in FIG. 5.

In a phase-shifter circuit 23, sinusoidal signal a is first of all adapted in its phase to that of measuring signal b. Phase-shifted sinusoidal signal a' is subsequently fed to each of two threshold-value circuits 24, 25, in which the positive half-waves in the case of threshold value c1 and the negative half-waves in the case of threshold value c2 are cut off. Square-wave signals d1 and d2 derived therefrom, whose periods are less than 180°, are in each case supplied to the control input of two analog switches 26 and 27.

Measuring signal b, supplied via input 22, is directly applied at the signal input of analog switch 26, and measuring signal b, which is routed via an inverter circuit 28 and is phase-shifted by 180°, is applied at the signal input of analog switch 27. During the positive pulses of signals d1 and d2, analog switches 26 and 27 become conductive, and therefore shortened, rectified, approximate sinusoidal half-waves e1 and e2 are obtained at the outputs of analog switches 26 and 27, respectively. These sinusoidal half-waves are subsequently combined in adding stage 29 to form rectified sinusoidal signal f, and conducted via a low-pass filter 31, at whose output 32 a filtered direct-voltage signal g is finally available as a motor switching signal.

If the normal closing operation, during which measuring signal b is formed, is disturbed by the touching of sensor device 3 (FIG. 1), then the amplitude (shown with a dotted line) of the measuring signal decreases sharply in accordance with b'. At output 32, a direct-voltage signal g' having a direct-voltage value close to 0 can then be picked off, through which the drive motor is immediately switched off.

Since the value of measuring signal b decreases suddenly when metal areas 5 are touched, a threshold value c can easily be set. At the same time, the temperature effect remains insignificant with respect to the measured-value change.

The filter frequency of phase-dependent rectifier arrangement 20 is corrected by the use of sinusoidal signal a of oscillator 8 as reference signal. Because of this, temperature-contingent frequency drifts of sinusoidal oscillator 8 no longer play a role. In addition, a narrow filter range is obtained which is insensitive to interference frequencies.

FIG. 6 shows a cross-section of a strip seal 32 with transmitter area 4, sensor wire 7 and potential-free metal areas 5, as well as insulator 6' formed by the strip seal.

What is claimed is:

1. An arrangement for detecting obstacles, comprising:
    a capacitive sensor device, including:
        an insulator, the insulator having a first side and a second side;
        an electrically conductive transmitter area, the transmitter area being on the first side of the insulator;
        an oscillator coupled to the transmitter area;
        an electrically conductive sensor wire being on the second side of the insulator;
        at least one essentially potential-free metal area being on the second side of the insulator; and
        an evaluation circuit coupled to the sensor wire.

2. The arrangement of claim 1, wherein the arrangement is used to detect obstacles during one of a closing of a convertible top and a closing of a motor vehicle window.

3. The arrangement of claim 1, wherein the transmitter area is acted upon by an AC voltage, the transmitter area is arranged opposite the at least one metal area, set apart by the insulator, the at least one metal area includes a formed cutout for accommodating the sensor wire in the insulator, and the evaluation circuit includes an output, the output providing a motor switching signal for switching a drive motor.

4. An arrangement for detecting obstacles, comprising:
    a capacitive sensor device, including:
        an insulator, the insulator having a first side and a second side;
        an electrically conductive transmitter area, the transmitter area being on the first side of the insulator;
        an oscillator coupled to the transmitter area;
        an electrically conductive sensor wire being on the second side of the insulator;
        at least one essentially potential-free metal area being on the second side of the insulator; and
        an evaluation circuit coupled to the sensor wire;
    wherein the transmitter area is acted upon by an AC voltage, the transmitter area is arranged opposite the at least one metal area, set apart by the insulator, the at least one metal area includes a formed cutout for accommodating the sensor wire in the insulator, and the evaluation circuit includes an output, the output providing a motor switching signal for switching a drive motor;
    and wherein the evaluation circuit further includes:
        a current-to-voltage converter for emitting a measuring signal; and
        a downstream phase-dependent rectifier arrangement, the phase-dependent rectifier arrangement being supplied with the AC voltage and the measuring signal, the phase-dependent rectifier arrangement having an output at which the motor switching signal can be picked off at one of a first level and a second level, the first level enabling the drive motor, the second level switching off the drive motor in response to an appearance of obstacles in a vicinity of the sensor device.

5. The arrangement of claim 4, wherein the phase-dependent rectifier arrangement includes:
    a phase shifter, the shifter further including an input to which the AC voltage is applied as a reference signal, the shifter further including an output;

first and second threshold circuits for shunting switching voltages, each threshold circuit having respective inputs connected to the output of the phase shifter, and each threshold circuit having respective outputs;

first and second analog switches, each analog switch having respective control inputs, the control input of the first analog switch connected to the output of the first threshold circuit, the control input of the second analog switch connected to the output of the second threshold circuit, the first and second analog switches further having signal inputs, the signal input of the first analog switch being directly fed the measuring signal, the signal input of the second analog switch being fed an inverted measuring signal, each of the first and second analog switches having an output; and an adding stage, the adding stage having an input connected to the outputs of the first and second analog switches, the adding stage having an output at which the motor switching signal can be picked off via a low-pass filter.

6. The arrangement of claim 2, wherein the sensor device for detecting obstacles during the closing of a convertible top is integrated in a crossbeam above a windshield of a motor vehicle.

7. The arrangement of claim 2, wherein the sensor device for detecting obstacles during the closing of a motor vehicle window is integrated in an upper crossbeam of a frame of the motor vehicle window.

8. The arrangement of claim 1, wherein the sensor device is surrounded by an elastic strip seal, the seal also forming the insulator.

* * * * *